(12) United States Patent
Ge et al.

(10) Patent No.: US 10,794,310 B2
(45) Date of Patent: Oct. 6, 2020

(54) ENGINE CONTROL SYSTEM AND METHOD

(71) Applicant: HITACHI AUTOMOTIVE SYSTEMS, LTD., Ibaraki (JP)

(72) Inventors: Zicheng Ge, Northville, MI (US);
Yahodeep Lonari, Northville, MI (US);
Kazuhiro Oryoji, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 71 days.

(21) Appl. No.: 16/158,381

(22) Filed: Oct. 12, 2018

(65) Prior Publication Data

US 2020/0116094 A1 Apr. 16, 2020

(51) Int. Cl.
*F02D 41/02* (2006.01)
*F01N 3/08* (2006.01)
*F02D 41/14* (2006.01)
*F02D 41/24* (2006.01)

(52) U.S. Cl.
CPC ....... *F02D 41/0275* (2013.01); *F01N 3/0885* (2013.01); *F02D 41/1405* (2013.01); *F02D 41/1458* (2013.01); *F02D 41/1462* (2013.01); *F02D 41/2429* (2013.01); *F01N 2900/1402* (2013.01); *F02D 2041/1437* (2013.01)

(58) Field of Classification Search
CPC ............. F02D 41/0275; F02D 41/1405; F02D 41/1458; F02D 41/2429; F02D 41/1462; F02D 2041/1437; F01N 3/0885; F01N 2900/1402
See application file for complete search history.

(56) References Cited

U.S. PATENT DOCUMENTS

| 5,964,199 A * | 10/1999 | Atago | F02D 41/40 123/295 |
|---|---|---|---|
| 2004/0124259 A1* | 7/2004 | Guezennec | B01D 53/79 239/135 |
| 2005/0183693 A1* | 8/2005 | Yang | F02D 13/0207 123/305 |
| 2007/0056554 A1* | 3/2007 | Li | F02D 35/025 123/305 |
| 2007/0089704 A1* | 4/2007 | Jacobsson | F02D 41/401 123/299 |

(Continued)

OTHER PUBLICATIONS

Ramesh et al., Evaluation of in-cylinder mixture homogeneity in a diesel HCCI engine—A CFD analysis, Jun. 2016, Elsevier B.V., vol. 19, Issue 2, pp. 917-925 (Year: 2016).*

(Continued)

*Primary Examiner* — Matthew T Largi
(74) *Attorney, Agent, or Firm* — Mattingly & Malur, PC

(57) ABSTRACT

In some examples, a system including one or more processors may receive sensor data from one or more sensors indicating one or more engine parameters of an engine including a combustion chamber. Based on the sensor data, the system may determine a homogeneity index indicative of a homogeneity of an air-fuel mixture within the combustion chamber. Furthermore, the system may determine an estimated amount of NOx in the exhaust gas based at least in part on the homogeneity index. In addition, based at least partially on the estimated amount of NOx in the exhaust gas, the system may send an instruction to control an engine component.

20 Claims, 10 Drawing Sheets

(56) References Cited

U.S. PATENT DOCUMENTS

| | | | | |
|---|---|---|---|---|
| 2008/0262695 A1* | 10/2008 | Gibson | ................ | F02D 41/307 |
| | | | | 701/102 |
| 2010/0083640 A1* | 4/2010 | Wang | .................... | F02D 35/026 |
| | | | | 60/286 |
| 2010/0122688 A1* | 5/2010 | Sihler | ................ | F02D 41/1497 |
| | | | | 123/350 |
| 2011/0155097 A1* | 6/2011 | Matsumura | ........... | F02D 41/401 |
| | | | | 123/299 |
| 2015/0167578 A1* | 6/2015 | Hotta | ................ | F02D 41/3035 |
| | | | | 701/104 |

OTHER PUBLICATIONS

Alrbai et al., Energy Sources, Part A: Recovery, Utilization, and Environmental Effects vol. 40, 2018—Issue 9 Article: Evaluating the in-cylinder gas mixture homogeneity in natural gas HCCI free piston engine under different engine parameters using 3D-CFD analysis (Year: 2018).*

* cited by examiner

ENGINE CONTROL SYSTEM AND METHOD

BACKGROUND

Nitrogen oxides (NOx) are a group of highly reactive gases that may react with other chemicals in the air to form both particulate matter and ozone. Both of these pollutants are harmful to humans when inhaled due to effects on the respiratory system. Furthermore, NOx may interact with water, oxygen, and other chemicals in the atmosphere to form acid rain. Acid rain can harm sensitive ecosystems such as lakes and forests. Internal combustion engine exhaust is a major source of discharging NOx into the atmosphere. Accordingly, reduction of NOx emission from internal combustion engines is a goal of a number of environmental regulations and standards.

During lean combustion conditions, the amount of NOx emissions may increase. Some vehicles include an NOx control device to remove at least a portion of NOx from the exhaust gases. One example of an NOx control device is a Lean NOx Trap (LNT), the purpose of which is to adsorb NOx from exhaust gases during lean combustion conditions. Further, the NOx adsorption surface of the LNT may be subsequently regenerated by operating the engine under rich combustion conditions for a period of time. Another example of an NOx control device is a selective catalytic reduction (SCR) device, which may be periodically regenerated using urea, anhydrous ammonia, or aqueous ammonia.

Accurate estimation of engine NOx output is typically desirable for employing NOx control devices, such as for determining the timing and/or amount of regeneration to apply. For instance, in the case of an NOx adsorber, operating the engine under rich conditions may be performed sufficiently long enough to regenerate the NOx adsorber; however, the rich operation mode should also be limited to avoid unnecessarily wasting fuel. Similarly, regenerating an SCR device too frequently may waste regeneration fluids, while failing to regenerate the SCR on time results in emission of NOx as pollutants.

SUMMARY

Some implementations are directed to a system including one or more processors that may receive sensor data from one or more sensors indicating one or more engine parameters of an engine including a combustion chamber. Based on the sensor data, the system may determine a homogeneity index indicative of a homogeneity of an air-fuel mixture within the combustion chamber. Furthermore, the system may determine an estimated amount of NOx in the exhaust gas based at least in part on the homogeneity index. In addition, based at least partially on the estimated amount of NOx in the exhaust gas, the system may send an instruction to control an engine component.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
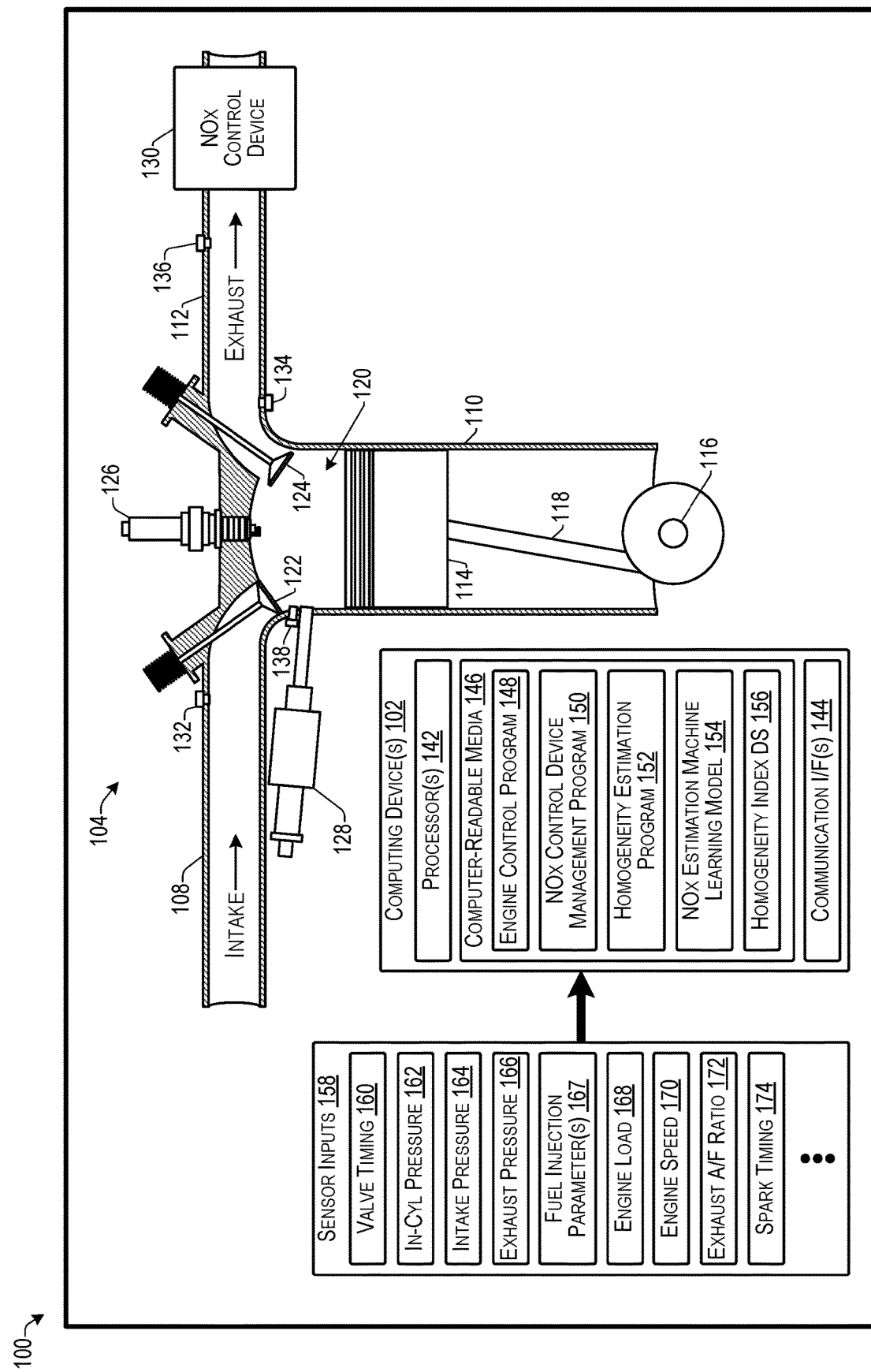
FIG. 1 illustrates select components of a system including an engine and an engine controller according to some implementations.

The technology herein includes novel arrangements and techniques for operating an NOx control device with improved efficiency over conventional techniques for reducing NOx emissions during lean burn occurrences and reducing fuel consumption or regenerating fluid consumption for regenerating the NOx control device. Some examples herein may use an estimation of an air-fuel mixture temperature and an estimated in-cylinder homogeneity index to determine an estimation of in-cylinder mixing and air-fuel-ratio conditions. The determined homogeneity index may be used as an input to a trained neural network or other machine learning model, along with other engine data from a plurality of sensors. The output of the machine learning model may indicate an estimation of the amount of NOx produced by the engine for a period of time.

Some implementations herein may predict an amount of NOx during transient engine conditions, such as when the flow is not stable and mixing of fuel and air is incomplete and more dynamic, such as due to various actuator lag time, or the like. For example, a transient state, such as engine acceleration or increasing load, may include delays in throttle, valves, turbocharger, or the like, which can affect the accuracy of the NOx production estimation. Accordingly, implementations herein are able to use the homogeneity index to more accurately predict the amount of NOx generated than conventional techniques. For example, implementations herein take into account the local mixture and air-fuel-ratio condition, which makes the overall NOx prediction more accurate. On the other hand, typical conventional systems tend to be based on the assumption that the in-cylinder mixture is relatively homogenous during transient conditions.

In some examples, the air-fuel mixture homogeneity index may be included as an input to an artificial neural network or other machine learning model trained to generate one or more correlations between an engine operating condition and an estimation of NOx output by the engine. The estimation of NOx output by the engine may be used for controlling engine operations for managing the performance of an NOx control device. The estimated NOx output of the engine may apply to both steady-state engine conditions and transient engine conditions. Accordingly, the NOx estimation machine learning model may be used to determine an accurate prediction of NOx output in the engine exhaust, which in turn may be used for accurate NOx control device performance modeling and engine control.

The inventors herein have determined that the NOx generation rate may be substantially related to local air-fuel-ratios at various different locations within each cylinder, such as in the case of a stratified mixture or otherwise non-uniform mixture. For instance, some examples may use fuel-injector-related information, such as injected fuel amount and injection timing, along with intake air estimation for determining homogeneity of the local air-fuel ratios. As one example, the homogeneity index at a spark location may be estimated based on executing a plurality of simulations over a range of engine operating conditions, which can provide an indication of the air-fuel mixture condition. The homogeneity index at the spark location may be indicative of how the spark ignites and develops, which can affect the flame front propagation, and thus, the thermal condition within the whole cylinder.

The inventors herein have further determined that another physical property that may affect NOx generation is the mixture temperature. For example, the NOx generation may have a direct correlation to the charge temperature, such as the maximum temperature of the air-fuel mixture inside the cylinder. However, the air-fuel mixture temperature is typically not accessible to the NOx control device and engine control program. Accordingly, implementations herein may determine an estimated mixture temperature, such as based on estimated in-cylinder pressure or measured in-cylinder pressure that may be measured using an injector-based pressure transducer positioned for measuring the pressure inside the combustion chamber. The estimated mixture temperature may provide an indication of the in-cylinder thermal environment and may provide direct information regarding NOx formation. This information enables the estimation made by the machine learning model to have a more physical basis for providing the NOx estimation.

The use of the in-cylinder flow and mixture conditions determined by the implementations herein may provide a more accurate estimation of NOx generation than conventional techniques. This may be based at least partially on the determined strong correlation between NOx prediction and combustion chamber homogeneity of local mixture conditions and the air-fuel-ratio. For example, a peak pressure determination and the mixture homogeneity index may improve the accuracy of the NOx generation prediction mechanism. Further, the techniques applied through use of these parameters and the trained machine learning model are more computationally efficient than traditional Zel'dovich or chemical kinetics calculations, and are therefore more efficient for real-time application in controlling an engine.

For discussion purposes, some example implementations are described in the environment of controlling the condition of an NOx control device for a lean-burn internal combustion engine. However, implementations herein are not limited to the particular examples provided, and may be extended to other engine types, other service environments, other NOx control devices, and for other applications, as will be apparent to those of skill in the art in light of the disclosure herein. For example, the techniques herein may be applied to engines having a throttle or engines that are throttle-less. Furthermore, the techniques herein may be applied to engines incorporating variable valve lift technology, turbochargers and superchargers, Otto cycle, Miller cycle, Atkinson cycle, Diesel cycle, homogeneous charge compression ignition, lean burn diesel engines, and so forth.

FIG. 1 illustrates select components of a system 100 including an engine and an engine controller according to some implementations. The system 100 includes one or more computing device(s) 102 and an engine 104. In some examples, the computing device(s) 102 may be one or more electronic control units (ECUs) or any other type of computing device located onboard a vehicle, or otherwise associated with the engine 104, and capable of performing the functions described herein. Further, in some cases, the functions described herein may be performed by a single computing device 102, while in other cases; the functions may be distributed across a plurality of computing devices 102 in any desired manner.

In some examples, the engine 104 may be a lean burn gasoline or diesel engine. However, other examples herein are limited to such. The engine 104 includes an intake passage 108, a cylinder 110, and an exhaust passage 112. A piston 114 is reciprocally moveable inside the cylinder 110 and is connected to a crankshaft 116 by a piston rod 118. The cylinder 110 includes a combustion chamber 120 with one or more intake valves 122 and one or more exhaust valves 124 per cylinder 110. Depending on the type of the engine 104, a plug 126, such as a spark plug or glow plug, may be included for providing an ignition spark or for providing heat for improving ignition in cold start cases, or the like. In other types of engines, the plug 126 might be eliminated.

In addition, a fuel injector 128 may be positioned to inject fuel such as gasoline, diesel fuel, or the like, into the combustion chamber 120 to provide direct injection of fuel. In other examples, the fuel injector 128 may be positioned to inject fuel into the intake passage 108 instead to provide indirect injection of fuel, rather than direct injection. Furthermore, implementations herein are not limited to direct injection and indirect injection, and may include carburetor fuel delivery, or the like.

As is known in the art, air is drawn into the combustion chamber 120 through the intake passage 108 and past the intake valve 122 (in the open position—not shown in FIG. 1) during an intake stroke of the piston 114. Subsequently, during the compression stroke, the fuel injector 128 may be activated to inject fuel into the combustion chamber, such as when the piston is approaching top dead center (TDC). In the case of indirect injection, the fuel may be injected during the intake stroke. In either event, as the piston approaches TDC during the compression stroke, the air-fuel mixture is ignited, such as due to compression of the fuel-air mixture, and/or due to a spark from the plug 126. Ignition of the air-fuel mixture drives the piston down during the power stroke, and exhaust gases are driven past the exhaust valve 124 as the piston moves back upward during an exhaust stroke, as shown in FIG. 1.

The exhaust gases may include NOx, which may be adsorbed from the exhaust gases or otherwise received by an NOx control device 130 positioned along the exhaust passage 112. Lean air-fuel ratios are known to produce higher combustion temperatures and, thus, higher rates of NOx than normal or rich air-fuel ratios. The NOx control device 130 may receive and store NOx during lean engine operation, and may release the NOx subsequently, such as by operating the engine 104 with a rich air-fuel ratio (in the case of an LNT) to remove the NOx from the adsorbing surface as e.g., $H_2O$, $N_2$, and CO. As one example, engines in transient states, such as during acceleration or during an increasing load, tend to have a fluctuating lean air-fuel ratio, as compared to engines operating at a steady state. Accordingly, the amount of NOx produced during the transient state is difficult to estimate theoretically, as compared to when the engine is operating at a steady state. Therefore, implementations herein are able to provide a more accurate estimation of NOx generated during transient engine states than conventional techniques.

The computing device(s) 102 may control the engine air-fuel ratio to control the timing of the regeneration stage for regenerating the NOx control device 130. As one example, the NOx control device may be a lean NOx trap (LNT) that may be periodically regenerated by operating the engine with a rich air-fuel ratio for a specified period of time. As another example, the NOx control device 130 may be a selective catalytic reduction (SCR) device, which may be periodically regenerated by exposing a catalyst to a regeneration fluid, such as urea, anhydrous ammonia, or aqueous ammonia. As mentioned above, the timing of the regeneration stage may be controlled and limited so that fuel or regeneration fluid is not wasted unnecessarily by performing the regeneration stage too often or for too long a time period. On the other hand, if the NOx control device 130 is full, i.e., unable to adsorb, react with, or otherwise receive any more NOx, then the NOx is released as a pollutant into the atmosphere, which is also undesirable.

The engine 104 may include a plurality of sensors, several of which are illustrated. For instance, the engine 104 may include an intake pressure sensor 132, an exhaust pressure sensor 134, an exhaust oxygen sensor 136, and an in-cylinder pressure sensor 138 that may be included with or otherwise associated with the fuel injector 128 in some examples, or which may be located in various other locations within the combustion chamber 120. Further, while several example sensors are illustrated in this example, numerous other types of sensors and other sources of engine parameter information may be included in the engine 104, and provided to the computing device(s) 102, as is known in the art.

In the illustrated example, the computing device 102 includes one or more processors 142, one or more communication interfaces 144, and one or more computer-readable media 146. Each processor 142 may be a single processing unit or a number of processing units, and may include single or multiple computing units, or multiple processing cores. The processor(s) 142 may be implemented as one or more ECUs, central processing units, microprocessors, microcomputers, microcontrollers, digital signal processors, state machines, logic circuitries, and/or any devices that manipulate signals based on operational instructions. For instance, the processor(s) 142 may be one or more hardware processors and/or logic circuits of any suitable type specifically programmed or configured to execute the algorithms and processes described herein. The processor(s) 142 may be configured to fetch and execute computer-readable instructions stored in the computer-readable media 146, which can program the processor(s) 142 to perform the functions described herein.

The computer-readable media 146 may include volatile and nonvolatile memory and/or removable and non-removable media implemented in any type of technology for storage of information such as computer-readable instructions, data structures, program modules, or other data. For example, the computer-readable media 146 may include, but is not limited to, RAM, ROM, EEPROM, flash memory or other memory technology, optical storage, solid-state storage, magnetic disk storage, cloud storage, or any other medium that can be used to store the desired information and that can be accessed by a computing device. Depending on the configuration of the computing device 102, the computer-readable media 146 may be a tangible non-transitory medium to the extent that, when mentioned, non-transitory computer-readable media exclude media such as energy, carrier signals, electromagnetic waves, and/or signals per se.

The computer-readable media 146 may be used to store any number of functional components that are executable by the processor(s) 142. In many implementations, these functional components comprise executable instructions and/or programs that are executable by the processor(s) 142 and that, when executed, specifically program the processor(s) 142 to perform the actions attributed herein to the computing device 102. Functional components stored in the computer-readable media 146 may include an engine control program 148, an NOx control device management program 150, and a homogeneity estimation program 152. As discussed additionally below, the engine control program 148 may include functionality for controlling the air-fuel ratio to periodically provide a rich fuel spike for regenerating the NOx control device 130. Further, the NOx control device management program 150 may receive estimations of NOx produced by the engine 104 over time, may compare a total amount of received NOx with a threshold level of NOx based on an amount of NOx that the NOx control device 130 is able to receive, and may send a communication to the engine control program 148 to schedule regeneration when the threshold level is exceeded.

In some examples, the NOx control device management program 150 and the homogeneity estimation program 152 may be modules of the engine control program 148. Alternatively, in other examples, the NOx control device management program 150 and the homogeneity estimation program 152 may be separately executable stand-alone computer programs that may be invoked independently or by the engine control program 148. In some cases, the functional components may be stored in a storage portion of the computer-readable media 146, loaded into a local memory portion of the computer-readable media 146, and executed by the one or more processors 142. Numerous other software and/or hardware configurations will be apparent to those of skill in the art having the benefit of the disclosure herein.

In addition, the computer-readable media 146 may store data, data structures, and models used for performing the functions and services described herein. For example, the computer-readable media 146 may store an NOx estimation machine learning model 154 and a homogeneity index data structure 156. The homogeneity index data structure 156 may be a database or any of various other types of data structures, such as multi-dimensional matrix, that includes a homogeneity index distribution for ranges of a plurality of engine parameters, such as may be determined from the engine sensors or the like. As discussed below with respect to, e.g., FIG. 6, the homogeneity index data structure 156 may be generated in advance for the engine 104 using a high fidelity 3D computation fluid dynamics (CFD) simulation program for a range of inputs, such as valve timing values, in-cylinder pressure values, intake pressure values, and exhaust pressure values for running simulations over a variety of engine operating conditions.

In addition, the NOx estimation machine learning model 154 may be executed by the NOx control device management program 150 to estimate an NOx quantity in an exhaust output from the combustion chamber 120. Examples of the NOx estimation machine learning model 154 may include artificial neural networks, such as recurrent neural networks, self-organizing neural networks, convolutional neural networks, modular neural networks, general regression neural networks, or other kinds of neural networks. Alternatively, the machine learning model 154 may include other types of machine learning models such as support vector machines, deep learning networks, predictive models, decision trees, regression models, and so forth. Accordingly, implementations herein are not limited to a particular type of machine learning model.

The machine learning model 154 may be trained offline, such as on another computing device using training data specific to the type of engine in a variety of operating conditions, and the type of NOx control device empirically measured under the variety of operating conditions. Following training and validation of the machine learning model 154, the machine learning model 154 may be stored on the computer-readable media 146 for execution by the one or more processors 142. For example, the machine learning model 154 may be invoked by the NOx control device management program 150, which may input an estimated homogeneity index and other engine parameters to the machine learning model 154, and which may determine an amount of NOx estimated to have been produced by the engine over a period of time based on the output of the machine learning model 154.

The computing device(s) 102 may also include or maintain other functional components, data and data structures, which may include programs, drivers, etc., and the data and data structures used or generated by the functional components, as discussed elsewhere herein. Further, the computing device(s) 102 may include other logical, programmatic, and physical components, of which those described above are merely examples that are related to the discussion herein.

Furthermore, the one or more communication interfaces 144 may enable the computing device 102 to communicate with other computing devices (not shown in FIG. 1) associated with the engine 104 and/or a vehicle in which the engine may be located. Accordingly, the communication interfaces 144 may enable communication over one or more controller area network (CAN) buses, or various other wired or wireless communication buses, networks, wiring harnesses, or the like. For example, the communication interfaces 144 may be connected to a plurality of sensors directly or indirectly, which may include the sensors 132-138 discussed above, as well as other sensors not illustrated in FIG. 1. In addition, the communication interfaces 144 may be connected for communication with various other engine components, such as the fuel injector 128 and/or other actuators (not shown in FIG. 1) in the engine 104.

Through the one or more communication interfaces 144, the computing device 102 may receive a plurality of sensor inputs 158. Examples of sensor inputs that may be received include valve timing 160, in-cylinder pressure 162, intake pressure 164, exhaust pressure 166, fuel injection parameter(s) 167 (e.g., fuel injection timing and/or fuel injection quantity), engine load 168, engine speed 170, exhaust air fuel ratio 172, and spark timing 174. Furthermore, while several example engine parameters associated with the engine 104 are discussed above, numerous other engine parameters that may be received by the computing device 102 will be apparent to those of skill in the art having the benefit of the disclosure herein.

Figure 2:
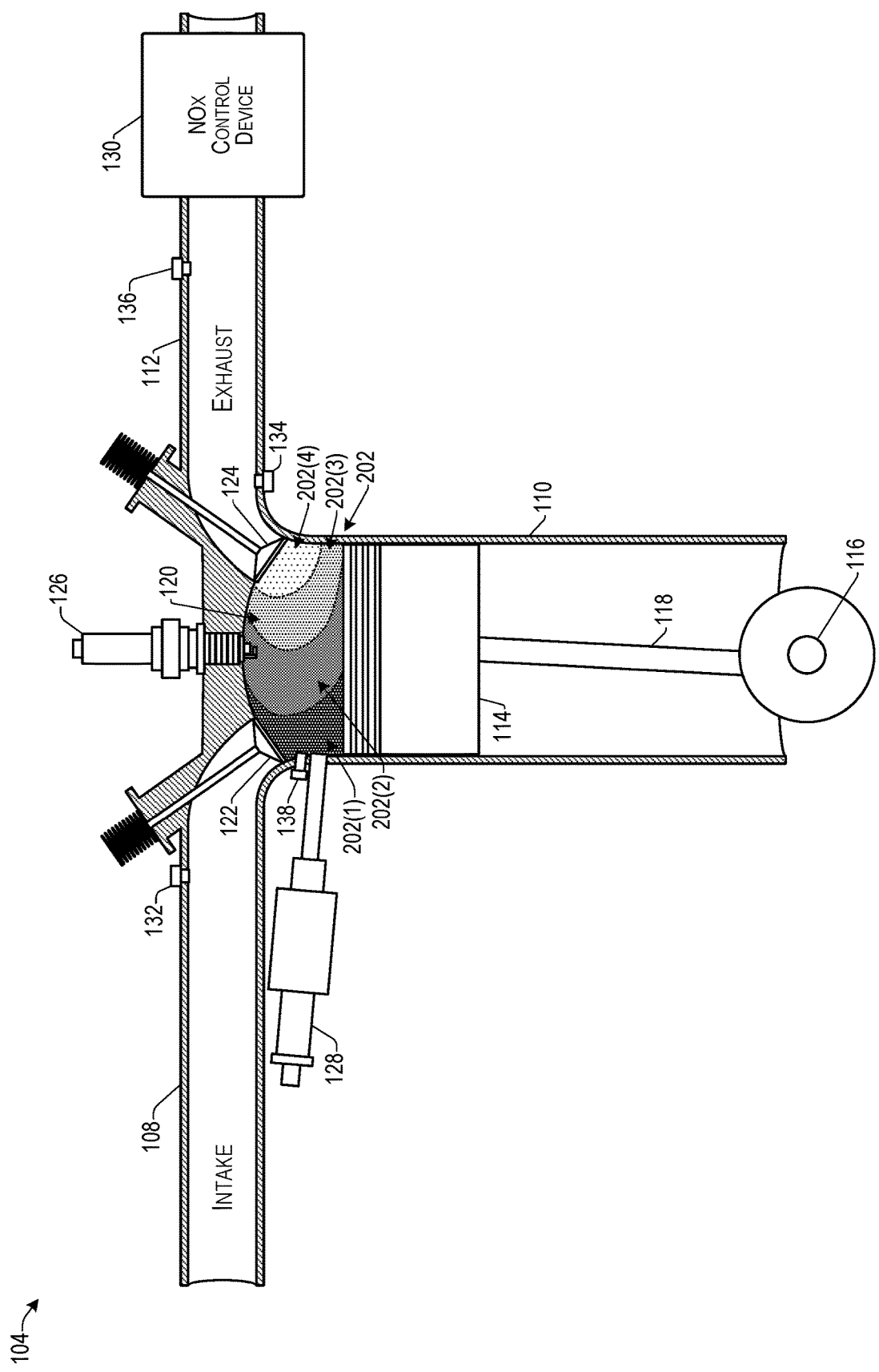
FIG. 2 illustrates an enlarged cross-section view of the example engine of FIG. 1 according to some implementations.

FIG. 2 illustrates an enlarged cross-section view of the example engine 104 of FIG. 1 according to some implementations. The illustrated example shows the engine 104 performing a compression stroke during a transient engine state such as due to engine acceleration or a changing engine load. As mentioned above, during the transient engine state, certain components such as valve timing, turbocharger, throttle response, and so forth can result in less than ideal mixing and differing levels of NOx emission that are difficult to predict.

In this example, suppose that the fuel injector 128 has just injected fuel into the combustion chamber 120, resulting in a plurality of different air fuel ratios in a plurality of different areas 202 (i.e., volumes) within the combustion chamber 120. For instance, suppose a first area 202(1) has a first air-fuel ratio that differs substantially from a second air-fuel ratio of an area 202(2), which differs from a third air-fuel ratio of an area 202(3), which differs from a fourth air-fuel ratio of an area 202(4). As one non-limiting example, suppose that the first area 202(1) is richer than desired and the third area 202(3) and the fourth area 202(4) are leaner than desired, while the second area 202(2) is approximately as desired. Accordingly, when combustion occurs, the leaner areas 202(3) and 202(4) may burn at a higher temperature than the richer area 202(1) and the area 202(2), which may result in generation of a larger than normal quantity of NOx than would be the case if the air-fuel ratio within the combustion chamber 120 was homogenous throughout the combustion chamber 120. Consequently, as discussed additionally below, implementations herein may use in-cylinder pressure and other considerations for determining a homogeneity index within the combustion chamber 120 during transient engine conditions for more accurately determining the amount of NOx generated by the engine over a period of time.

Figure 3:
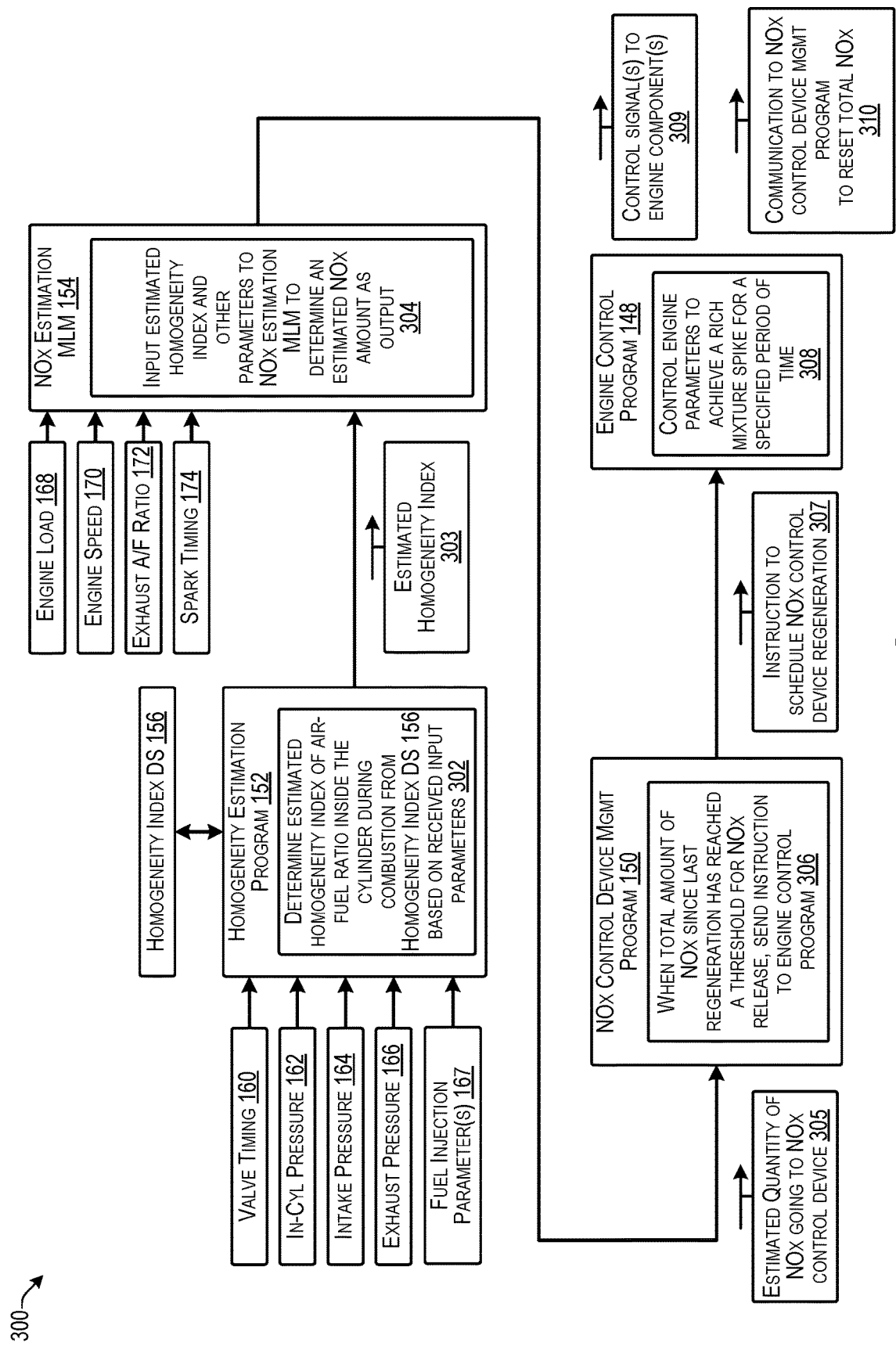
FIG. 3 illustrates an example process for controlling the engine for maintaining the NOx control device in an operative condition according to some implementations.
Figure 6:
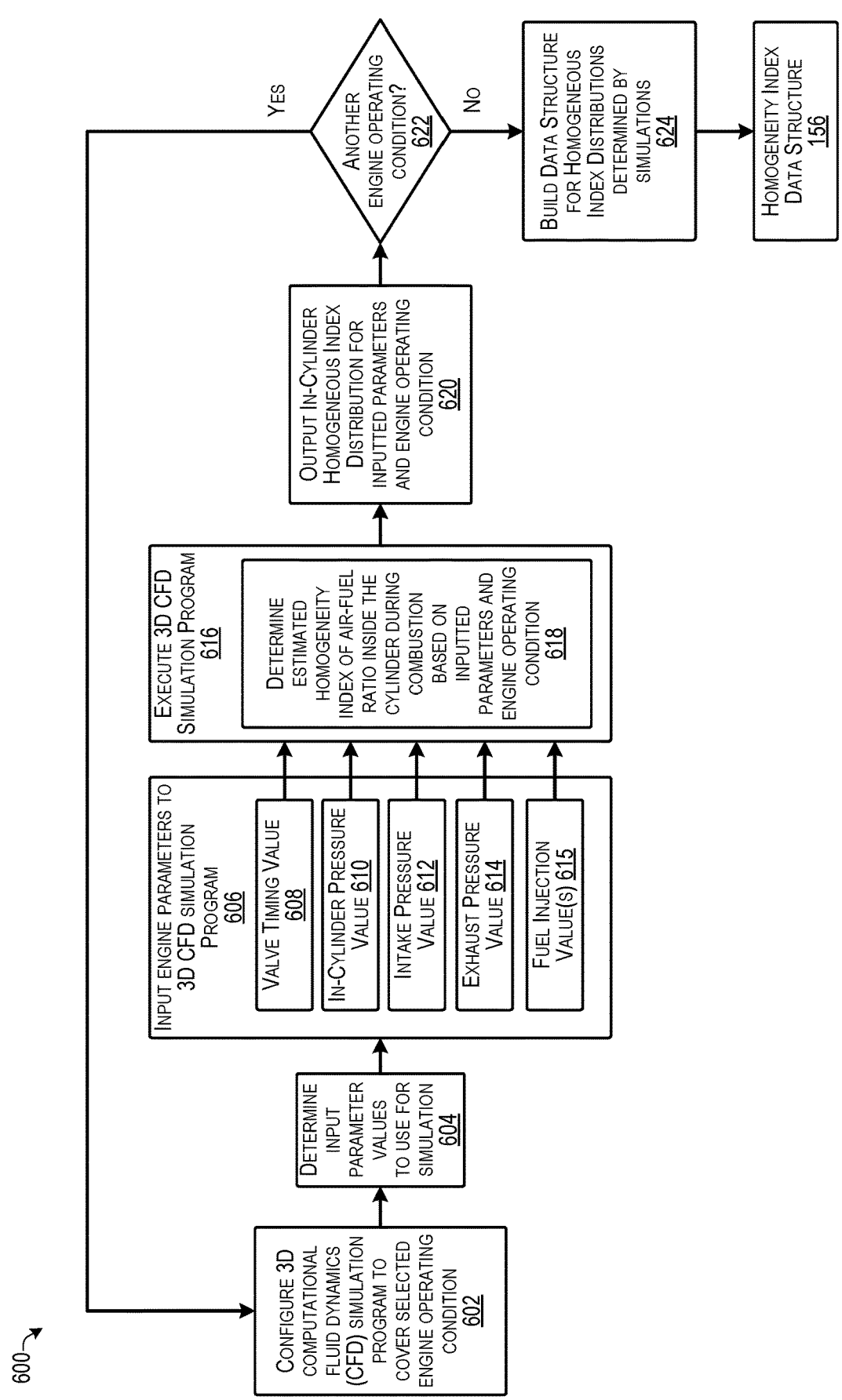
FIG. 6 is a flow diagram illustrating an example process for generating a homogeneity index data structure according to some implementations.
Figure 7:
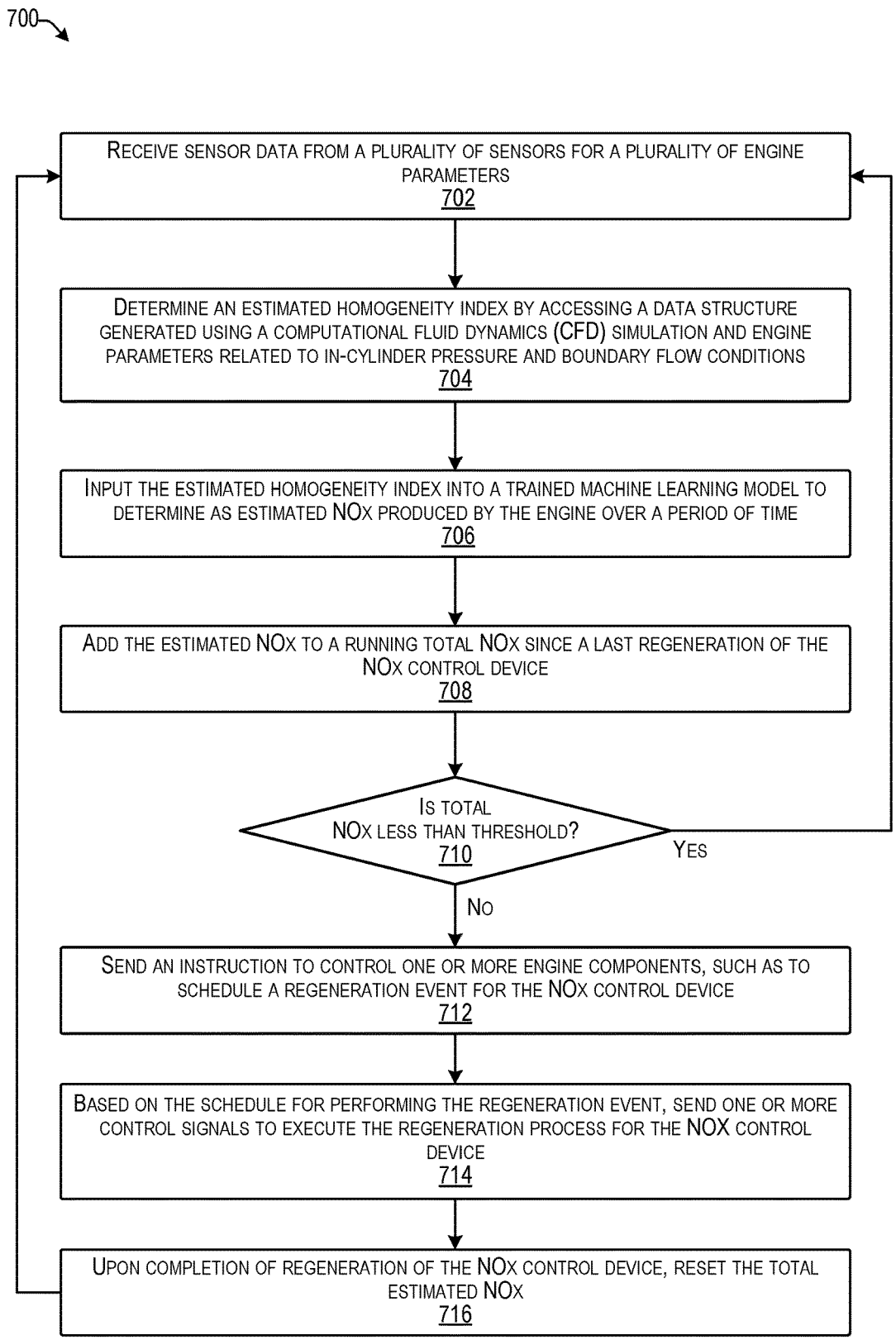
FIG. 7 is a flow diagram illustrating an example process for estimating NOx in exhaust gas according to some implementations.

FIGS. 3, 6, and 7 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 3 illustrates an example process 300 for controlling the engine for maintaining the NOx control device in an operative condition according to some implementations. The process 300 may be performed by the one or more computing devices 102, such as by executing the engine control program 148, the NOx control device management program 150, and the homogeneity estimation program 152. In some examples, the NOx control device management program 150 may manage execution of the homogeneity estimation program 152 and may execute the NOx estimation MLM 154 to obtain an estimated quantity of NOx.

At 302, the homogeneity estimation program 152 may receive a plurality of input parameters such as valve timing 160, in-cylinder pressure 162, intake pressure 164, exhaust pressure 166, and/or fuel injection parameter(s) 167. In some examples, fewer than all of these input parameters may be received, while in other examples additional or alternative input parameters may be received. Using the received input parameters, the homogeneity estimation program 152 may determine an estimated homogeneity index of the air fuel ratio inside the cylinder during combustion based on the received input parameters.

For example, the intake pressure along with the in-cylinder pressure, the exhaust pressure, the valve timing, an injected fuel amount and an injection timing may be indicative of the mixture condition in the combustion chamber. The homogeneity index at the spark location may determine how the spark ignites and how the flame front develops, which can affect the thermal conditions within the entire combustion chamber and the amount of NOx produced.

As one example, the homogeneity estimation program 152 may use a plurality of parameters, such as may be determined from engine sensors, or the like, when accessing the homogeneity index data structure 156 for determining an estimated homogeneity index 303 that correlates to the plurality of parameters. As mentioned above, the plurality of parameters may include valve timing 160, in-cylinder pressure 162, intake pressure 164, exhaust pressure 166, and fuel injection parameters 167. The homogeneity index data structure 156 is built using a high fidelity CFD simulation model for the engine and using a range of values for each of the plurality of parameters over a range of engine operating conditions. The use of the high fidelity CFD simulation model and the plurality of parameters for generating the homogeneity index data structure 156 provides improved accuracy over merely determining a homogeneity index based on an estimated in-cylinder temperature or the like. Additional details of generating the homogeneity index data structure 156 are discussed below, e.g., with respect to FIGS. 6 and 8.

Following determination of the estimated homogeneity index 303, the estimated homogeneity index 303 is used as an input to the NOx estimation MLM 154. For example, the NOx control device management program may invoke the homogeneity estimation program 152, may receive the estimated homogeneity index 303 as output from the homogeneity estimation program 152. As several non-limiting examples, the estimated homogeneity index 303 may be determined and provided to the NOx estimation MLM 154 every with every firing (combustion cycle) of a selected cylinder or multiple cylinders, every other firing, and so forth, depending on a desired level of accuracy and available computing resources.

At 304, the NOx control device management program 150 may input the estimated homogeneity index 303 as input to the NOx estimation MLM 154 for executing the NOx estimation MLM 154 to determine an estimated NOx amount as output. In addition, a plurality of other engine parameters may be included as inputs to the NOx estimation MLM 154 along with the estimated homogeneity index 303. Examples of other engine parameters that may be used as inputs to the NOx estimation MLM 154 include the engine load 168, the engine speed 170, the exhaust air-fuel ratio 172, and the spark timing 174. For instance, these parameters may all be determined from various sensors associated with the engine, as discussed above.

Through execution of the NOx estimation MLM 154, the NOx control device management program 150 may receive an estimated quantity 305 of NOx going to the NOx control device. As mentioned above, the frequency with which this information is received may be at least partially based on the rpm at which the engine is operating. For instance, the estimated quantity 305 of NOx may be received with every combustion cycle in some examples. The NOx control device management program 150 may keep a running tally of NOx accumulated by the NOx control device since the last regeneration event. For example, the NOx control device management program 150 may compare a current total of estimated NOx since the last regeneration, and may compare the current total with a threshold corresponding to the capacity of NOx adsorption by the NOx control device. At 306, when the total amount of NOx since the last regeneration of the NOx control device has reached the threshold for requesting NOx release, the NOx control device management program 150 may send an instruction 307 to schedule NOx control device regeneration to the engine control program 148.

At 308, the engine control program 148 may control engine parameters to achieve a rich mixture spike for a specified period of time. For example, the engine control program 148 may send one or more control signals 309 to one or more engine components for achieving the rich mixture spike. For instance, the engine control program 148 may control the amount of fuel injected into one or more of the cylinders, the valve timing of one or more of the cylinders, or the like to control the air fuel ratio of one or more of the cylinders of the engine. When the engine control program 148 determines that the rich mixture spike has transpired for a specified period of time, the engine control program 148 may send one or more additional control signals to the one or more engine components to return the one or more cylinders to the lean burn configuration. In addition, following completion of the rich mixture spike, the engine control program 148 may send a communication 310 to the NOx control device management program 150 to indicate that regeneration is completed. In response, the NOx control device management program 150 may reset to zero, or other baseline, its running total of the amount of analytics generated since the last regeneration of the NOx control device, and the process may return to block 302.

Figure 4:
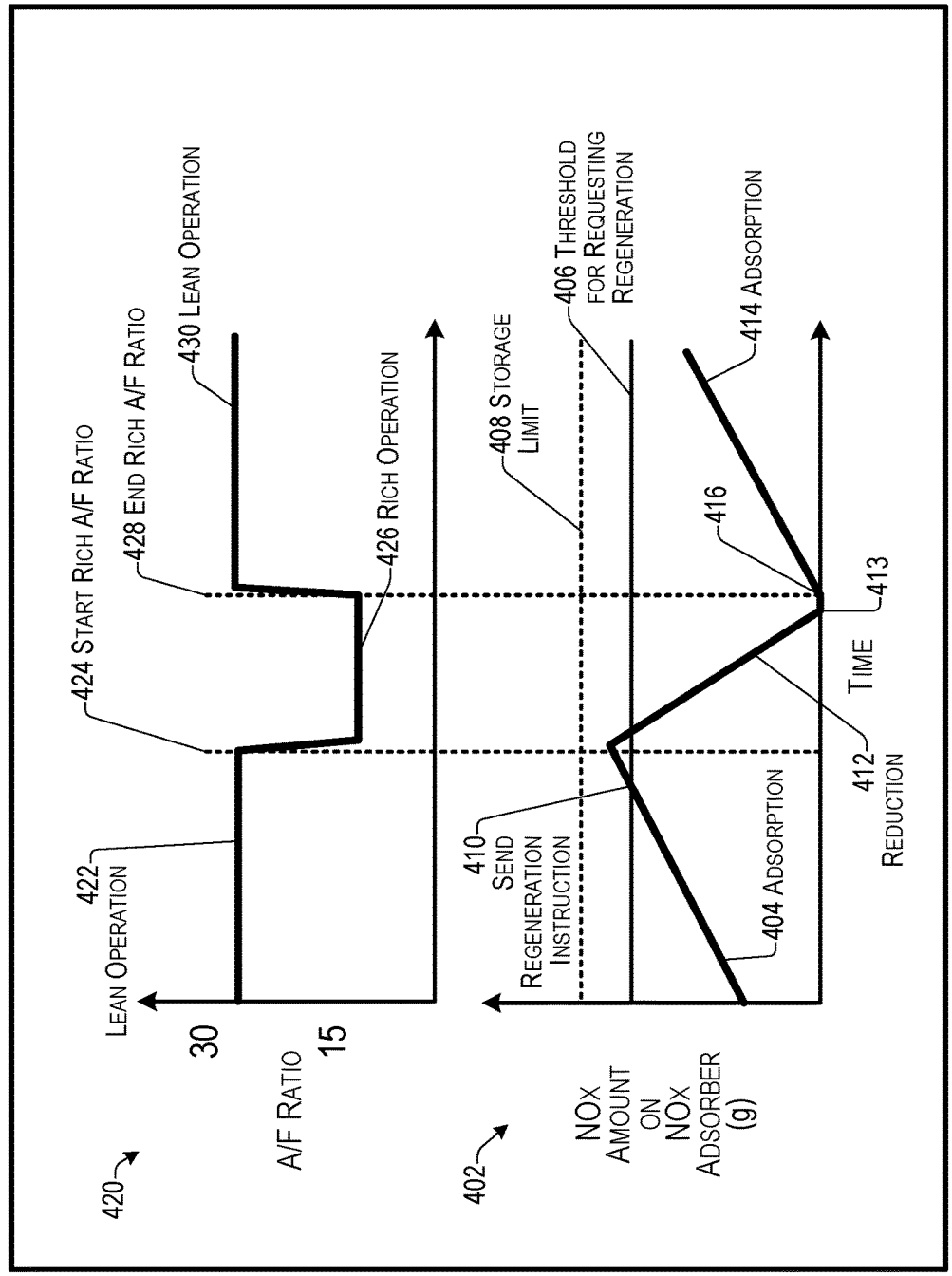
FIG. 4 illustrates example graphs according to some implementations.

FIG. 4 illustrates example graphs 400 according to some implementations. In this example, a first graph 402 indicates an amount of NOx in an NOx adsorber, such as an LNT, as a function of time based on the estimated NOx estimated to have been produced by the engine since the last regeneration event. The amount of NOx increases over time during an adsorption phase, as indicated at 404. The graph 402 further shows a threshold for requesting regeneration as indicated at 406, and a maximum storage limit of the NOx adsorber as indicated at 408. As indicated at 410, when the estimated amount of NOx estimated to have been produced by the engine since the last regeneration event reaches the threshold of 406, the NOx adsorber control program sends an instruction to schedule a rich air fuel ratio operation spike event, as discussed above with respect to FIG. 3. In response, as discussed above, the engine control program may send one or more control signals to one or more engine components to execute the rich spike event.

As indicated at 412, when the rich air fuel ratio operation begins, the amount of NOx maintained on the NOx adsorber goes through a reduction until it reaches a minimum as indicated at 413. In some examples, the rich spike event may be timed to slightly overshoot to ensure that an optimal amount of reduction has taken place. Following this amount of time, the engine control program may send one or more additional control signals to resume lean operation of the engine and the NOx adsorber control program may again began estimating the total amount of NOx produced by the engine during adsorption, as indicated at 414, since the end of the last rich operation spike event, as indicated at 416.

Graph 420 illustrates the air fuel ratio over time in relation to the rich operation spike event discussed above. In this example, as indicated at 422 the engine normally operates under a lean operating condition. At 424, in response to the control signal received from the engine control program, and based on the regeneration instruction 410 received from the NOx adsorber control program, the engine begins running a rich air fuel mixture as indicated at 424. The engine may operate under a rich air fuel ratio, as indicated at 426, for an amount of time to enable the regeneration of the NOx adsorber. For instance, a threshold period of time and/or specified air fuel ratio may have been determined in advance, such as empirically, for the NOx adsorber. Accordingly, following expiration of the threshold period of time, the engine control program may send one or more control signals to end the rich air fuel ratio, as indicated at 428. Thus, the engine may resume lean operation as indicated at 430.

Figure 5:
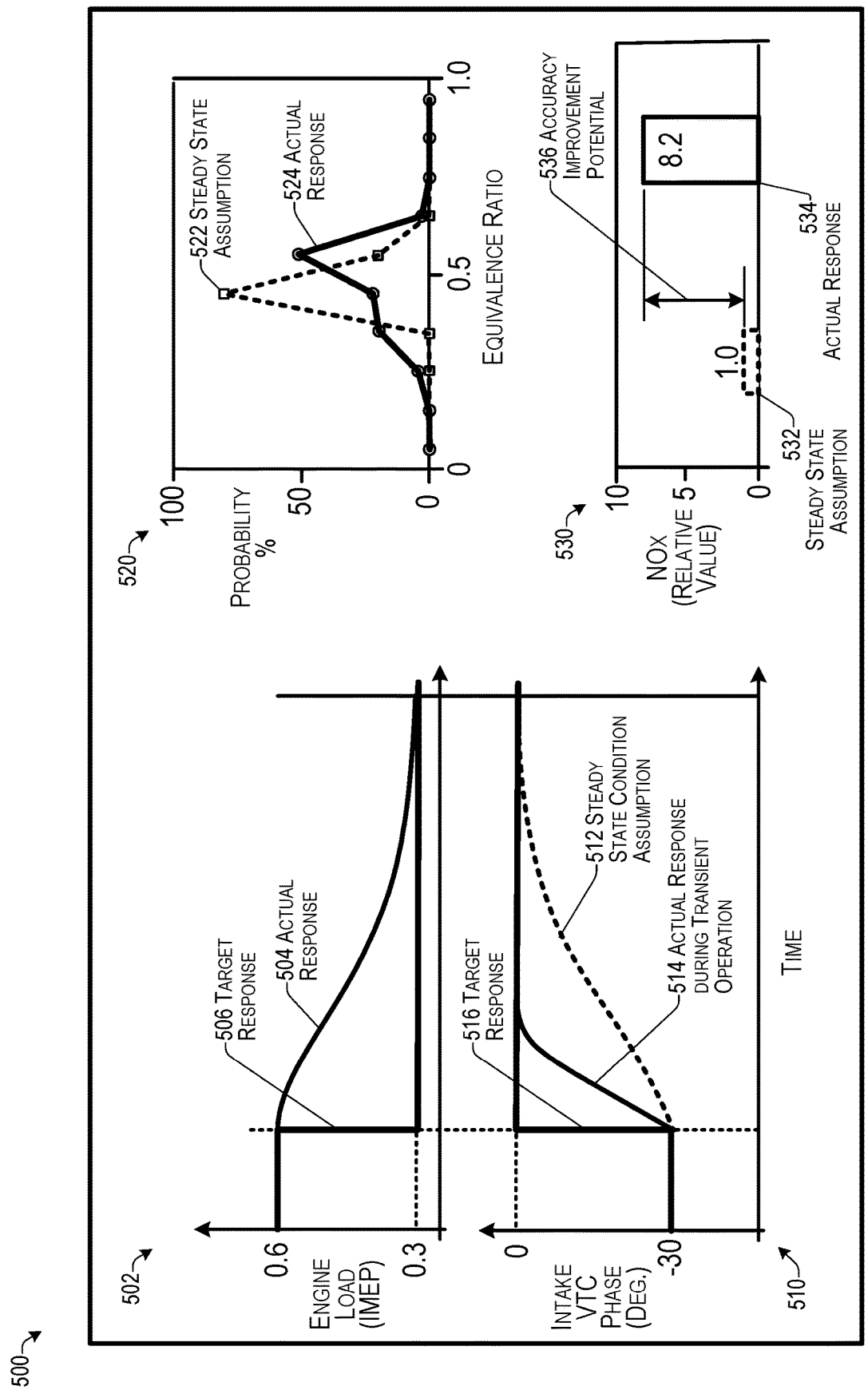
FIG. 5 illustrates example graphs according to some implementations.

FIG. 5 illustrates example graphs 500 according to some implementations. In this example, a first graph 502 indicates engine load over time during a transient condition. For example, the first graph 502 shows that the indicated mean effective pressure (IMEP), which is an indication of the engine's capacity to do work, changes over time from 0.6 to 0.3, indicating that the engine is under an increasing load. A curve 504 indicates the actual response of the engine under the load. On the other hand, if the engine were able to adjust immediately, a target response 506 would indicate the immediate change in IMEP.

In addition, a second graph 510 indicates a response in a variable timing control (VTC) system. In this example, the intake VTC phase over time is shown. A first dashed curve 512 shows a steady state condition assumption adopted by conventional solutions. Furthermore, a solid curve 514 shows the actual response between a phase of −30 and zero in a transient engine condition, indicating that the phase behaves differently from the steady state condition, which can lead to increased NOx production. The second graph 510 also indicates the target response 516 corresponding the target 506 discussed above.

Additionally, a third graph 520 shows two plots of equivalence ratio probability for the steady state assumption 522 and for actual response 524. For instance, the equivalence ratio may be defined as the ratio of the actual air-fuel ratio to a stoichiometric air-fuel ratio. If the equivalence ratio is equal to one, the combustion is stoichiometric. In theory, a stoichiometric mixture has just enough air to completely burn the available fuel. If the equivalence ratio is less than one, the combustion is lean with excess air, and if the equivalence ratio is greater than one, the combustion is rich with incomplete combustion. For example, the NOx estimation reflecting the equivalence ratio probability may be calculated using the following formula:

$$NO_x = \sum_{\phi=0.45}^{\phi=1.0} f(\phi) Y(\phi)$$

where ϕ is the equivalence ratio, f(ϕ) is the probability, such as in percent, for the equivalence ratio and Y(ϕ) is the NOx mass fraction.

Additionally, graph 530 illustrates a normalization of the results from graph 520. For example, based on the above formula, the amount of NOx in (A) and (Ba) may be normalized to show relative values of NOx. Accordingly, as an example, based on the normalized NOx density in which the steady state assumption 532 is equivalent to a value of 1.0, the actual response 534 may have a value of 8.2 in some cases, to illustrate the potential for improvement of the accuracy of NOx estimation, as indicated at 536.

Accordingly, conventional techniques may significantly underestimate the NOx produced during transient engine operation. On the other hand, the implementations herein use the home agenda the index to more accurately estimate the amount of NOx produced by the engine during transient operation states, thereby enabling greater efficiency in operation of the engine and the NOx control device.

FIG. 6 is a flow diagram illustrating an example process 600 for generating a homogeneity index data structure according to some implementations. The homogeneity index data structure 156 may be generated by one or more computing devices, such as one or more simulation computing devices and one or more data structure building computing devices. In some examples, these may be the same computing device, while in other examples, they may be separate computing devices. The process 600 may be performed offline and the resulting homogeneity index data structure 156 may subsequently be stored in computer-readable media on the vehicle, e.g., as discussed above with respected to FIG. 1, for use in determining an estimated homogeneity index, e.g., as discussed above with respect to FIG. 3.

At 602, a 3D computational fluid dynamics (CFD) simulation program may be configured on the computing device to cover a selected engine operating condition. For example, a plurality of simulations may be executed successively or in parallel for a plurality of different engine operating conditions, with each simulation being for a selected one of the engine operating conditions.

At 604, the computing device may determine input parameter values to use for the simulation. For example, the input parameter values may include a valve timing value 608, an in-cylinder pressure value 610, an intake pressure value 612, an exhaust pressure value 614, and fuel injection value(s) 615 (e.g., an amount of fuel injected and/or a timing of the fuel injected) that may have been determined empirically, or through other techniques, for the selected engine operating condition for a specified engine for which the homogeneity index data structure 156. Furthermore, while several input parameters are described in this example, more or fewer parameters may be used in other examples, as will be apparent to those of skill in the art having the benefit of the disclosure herein.

At 606, the computing device may input the engine parameters 608-614 into the previously configured 3D CFD simulation program. In some examples, the 3D CFD simulation program may be available from Hitachi Ltd. of Tokyo, Japan, although other simulation programs may be similarly used, as is known in the art.

At 616, the computing device may execute the 3D CFD simulation program. For instance, as indicated at 618, based on the inputted parameters and the selected engine operating condition, the 3D CFD simulation program may determine an estimated homogeneity index of the air-fuel ratio inside the cylinder during combustion.

At 620, the 3D CFD simulation program may output an in-cylinder homogeneous index distribution for the inputted parameters and the selected engine operating condition. Examples of the in-cylinder homogeneous index distribution are discussed above, e.g., with respect to FIG. 5.

At 622, the computing device may determine whether all of the engine operating conditions of interest have been simulated. If all engine operating conditions of interest have been simulated, the process goes to 624. If not, the process returns to 602 to select another engine operating condition for simulation.

At 624, the computing device may execute a data structure building program to generate a data structure, such as a database, for the homogeneous index distributions determined by the simulations. For example, the data structure may include a plurality of homogeneous index distributions corresponding to various values of the parameters 608-615. The output of the data structure building program is the homogeneity index data structure 156.

FIG. 7 is a flow diagram illustrating an example process 700 for estimating NOx in exhaust gas according to some implementations. In some examples, the process 700 may be performed by one or more processors of the computing device 102 by executing the management program(s) 122 for performing at least some of the operations described in the process 700.

At 702, the computing device may receive sensor data from a plurality of sensors or the like, for a plurality of engine parameters. For example, the engine parameters may include valve timing, in-cylinder pressure, intake pressure, exhaust pressure, fuel injection parameters, engine load, engine speed, exhaust air fuel ratio, and spark timing. Furthermore, while several engine parameters are mentioned in this example, numerous other engine parameters that may be received by the computing device 102 will be apparent to those of skill in the art having the benefit of the disclosure herein.

At 704, the computing device may determine an estimated homogeneity index by accessing a data structure generated using a 3D computational fluid dynamics (CFD) simulation and engine parameters related to in-cylinder pressure and boundary flow conditions. For example, the computing device may use the in-cylinder pressure data along with intake pressure, exhaust pressure, valve timing, and/or fuel injection timing and quantity to determine the estimated homogeneity index by accessing the homogeneity index data structure. As discussed above, the homogeneity index data structure may contain pre-calculated homogeneity index distributions determined using CFD simulations for a plurality of different in-cylinder pressures and/or others of the above-mentioned engine parameters.

At 706, the computing device may input the estimated homogeneity index into a trained machine learning model to determine as estimated NOx produced by the engine over a period of time.

At 708, the computing device may add the estimated NOx determined from the machine learning model to a running total NOx tracked since a last regeneration of the NOx control device.

At 710, the computing device may determine whether the total NOx is less than a threshold level for scheduling regeneration. If the total is below the threshold, the process returns to 702. If the total exceeds the threshold, the process goes to 712.

At 712, the computing device may send an instruction to control one or more engine components, such as to schedule a regeneration event for NOx control device.

At 714, based on the schedule for performing the regeneration event, the computing device may send one or more control signals to execute the regeneration process for the NOx control device. For example, in the case that the NOx control device is an NOx adsorber, the control signals may be to control the fuel injector for at least one cylinder, such as to change the injection timing, increase an injection duration, change valve timing, or otherwise change the engine parameters to achieve a targeted rich air-fuel ratio. Furthermore, in the case that the NOX control device is an SCR device, the control signal may cause the regenerating substance to be sprayed into exhaust gases entering the SCR device, or may otherwise cause the reactive surfaces of the SCR device to be contacted by the regenerating substance.

At 716, upon completion of regeneration of the NOx control device the computing device may reset the total estimated NOx, such as by setting the running total to zero.

Figure 8:
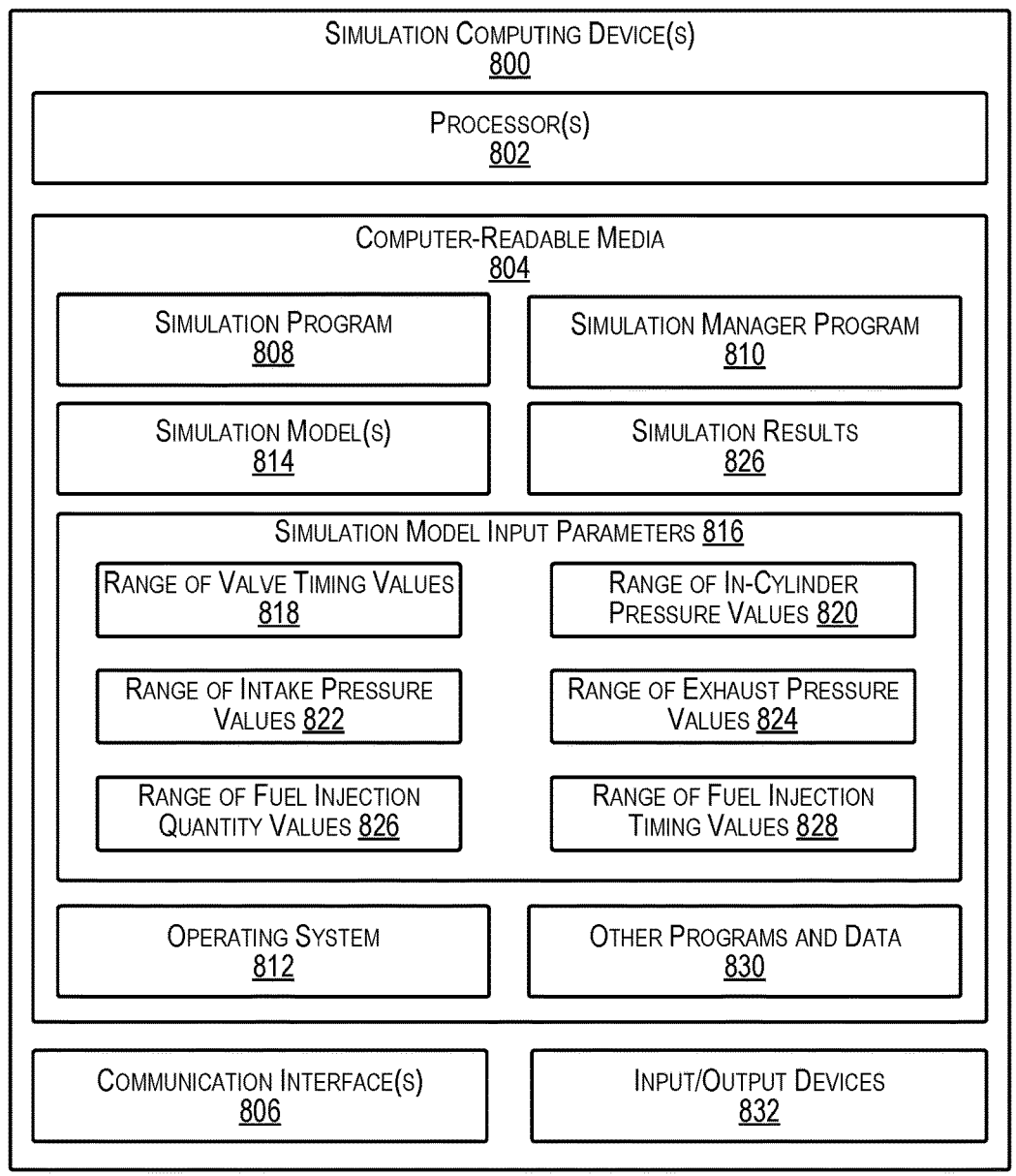
FIG. 8 illustrates one or more simulation computing devices according to some implementations.

FIG. 8 illustrates select components of one or more simulation computing device(s) 800 that may be used to implement some functionality of the simulation services described herein. The simulation computing device(s) 800 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the functional components and data of the simulation computing device(s) 800 as being present in a single location, these components and data may alternatively be distributed across different computing devices and different locations in any manner Consequently, the functions may be implemented by one or more computing devices, with the various functionality described above distributed in various ways across the different computing devices. Multiple simulation computing devices 800 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each simulation computing device(s) 800 may include one or more processors 802, one or more computer-readable media 804, and one or more communication interfaces 806. Each processor 802 may be a single processing unit or a number of processing units, and may include single or multiple computing units, or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the simulation computing device(s) 800, the computer-readable media 804 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the simulation computing device(s) 800. Functional components stored in the computer-readable media 804 may include a simulation program 808 and a simulation management program 810.

For example, the simulation program 808 may be a high fidelity 3D computational fluid dynamics simulation program available from Hitachi, Ltd., of Tokyo, Japan. Similar fluid dynamics simulation programs may be obtained from other sources, as is known in the art. Techniques for configuring and executing a simulation program are well known to those of skill in the art and will not be described in detail herein. Simulation management program 810 may be used by a user to control configuration and execution of the simulation program 808, such as over a network via a client computing device, or the like (not shown in FIG. 8). Additional functional components stored in the computer-readable media 804 may include an operating system 812 for controlling and managing various functions of the simulation computing device(s) 800.

In addition, the computer-readable media 804 may store data used for performing the operations described herein. Thus, the computer-readable media 804 may store simulation model input parameters 816, which may include a range of valve timing values 818, a range of in-cylinder pressure values 820, a range of intake pressure values 822; a range of exhaust pressure values 824, a range of fuel injection quantity values 826, and/or a range of fuel injection timing values 828. In addition, the computer-readable media 804 may store or otherwise maintain the simulation results 826, which, as discussed above may include in-cylinder homogeneous index distributions determined by the simulation program 808 for a plurality of engine operation conditions and parameter values 818-828.

The simulation computing device(s) 800 may also include or maintain other functional components and data not specifically shown in FIG. 8, such as other programs and data 830, which may include programs, drivers, etc., and the data used or generated by the functional components. Further, the simulation computing device(s) 800 may include many other logical, programmatic, and physical components, of which those described above are merely examples that are related to the discussion herein.

The communication interface(s) 806 may include one or more interfaces and hardware components for enabling communication with various other devices, such as over one or more networks (not shown in FIG. 8). For example, communication interface(s) 806 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The simulation computing device(s) 800 may further be equipped with various input/output (I/O) devices 832. Such I/O devices 832 may include a display, various user interface controls (e.g., buttons, joystick, keyboard, mouse, touch screen, etc.), audio speakers, connection ports and so forth.

Figure 9:
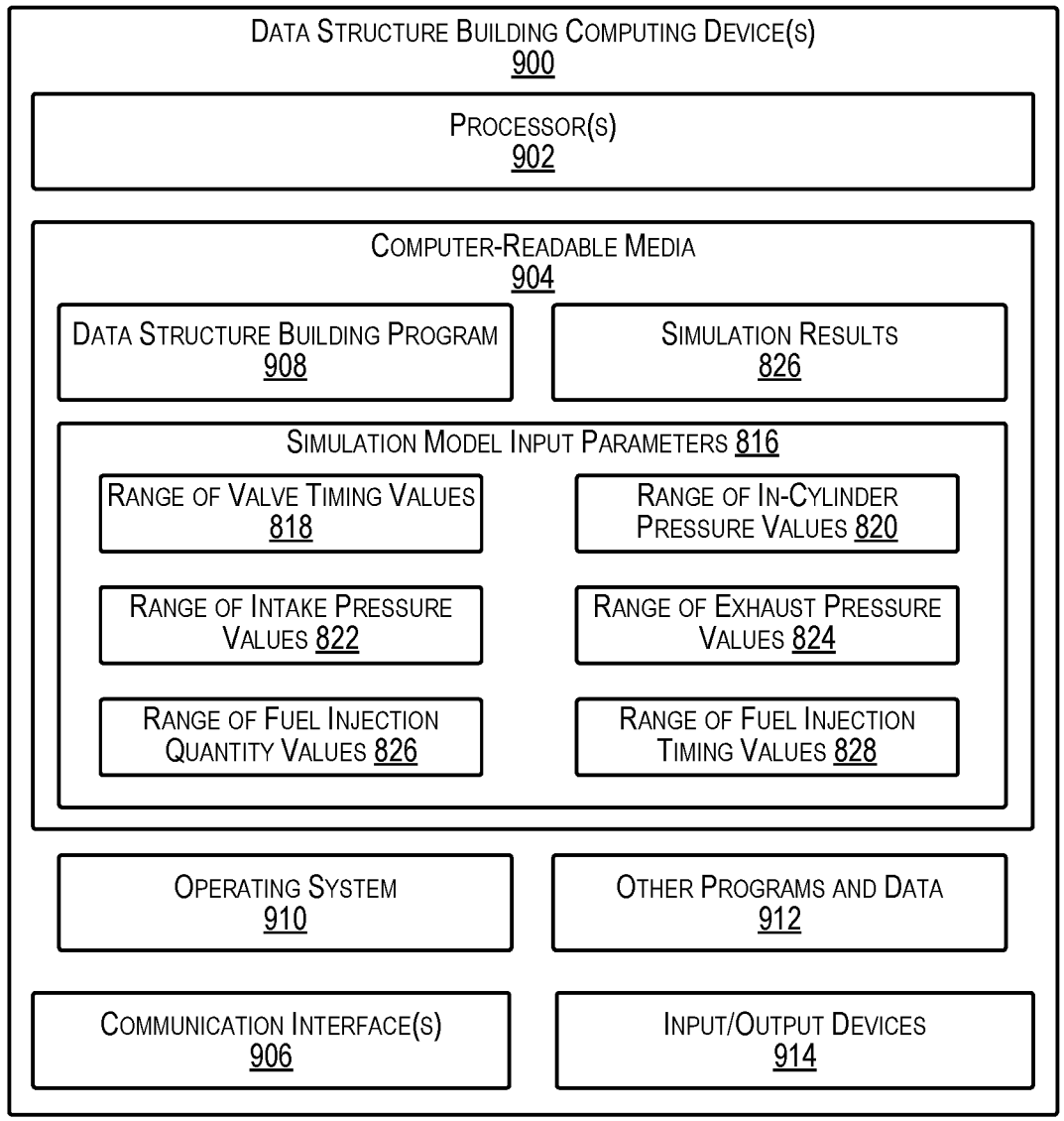
FIG. 9 illustrates one or more data structure building computing devices according to some implementations.

FIG. 9 illustrates select components of one or more data structure building computing device(s) 900 that may be used to implement some functionality of the data structure building services described herein. Data structure building computing device(s) 900 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. In some cases, the data structure building computing device(s) 900 may be the same computing device(s) as the simulation computing device(s) 800 described above, while in other cases, the data structure building computing device(s) 900 may be partially or entirely separate from the simulation computing devices 800.

Further, while the figures illustrate the functional components and data of the data structure building computing device(s) 900 as being present in a single location, these components and data may alternatively be distributed across different computing devices and different locations in any manner. Consequently, the functions may be implemented by one or more computing devices, with the various functionality described above distributed in various ways across the different computing devices. Multiple data structure building computing device(s) 900 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each data structure building computing device(s) 900 may include one or more processors 902, one or more computer-readable media 904, and one or more communication interfaces 906. Each processor 902 may include or may similar to any of the processors 802 discussed above with respect to FIG. 8. The computer-readable media 904 may include or may similar to any of the computer-readable media 904 discussed above with respect to FIG. 8. The communication interfaces 906 may include or may similar to any of the communication interfaces 806 discussed above with respect to FIG. 8.

The computer-readable media 904 may be used to store any number of functional components that are executable by the processors 902. In many implementations, these functional components comprise instructions or programs that are executable by the processors 902 and that, when executed, specifically configure the one or more processors 902 to perform the actions attributed above to the data structure building computing device(s) 900. Functional components stored in the computer-readable media 904 may include a data structure building program 908.

For example, the data structure building program 908 may receive the simulation results 826 and the simulation model input parameters 816 from the simulation computing device(s) 800, and may construct a database or other data structure, such as a multi-dimensional matrix, to enable fast look up of an estimated homogeneity index based on receiving inputs of one or more of the engine parameters discussed above. Additional functional components stored in the computer-readable media 904 may include an operating system 910 for controlling and managing various functions of the data structure building computing device(s) 900.

The data structure building computing device(s) 900 may also include or maintain other functional components and data not specifically shown in FIG. 9, such as other programs and data 912, which may include programs, drivers, etc., and the data used or generated by the functional components. Further, the data structure building computing device(s) 900 may include many other logical, programmatic, and physical components, of which those described above are merely examples that are related to the discussion herein.

The data structure building computing device(s) 900 may further be equipped with various input/output (I/O) devices 914. Such I/O devices 914 may include or may similar to any of the I/O devices 832 discussed above with respect to FIG. 8.

Figure 10:
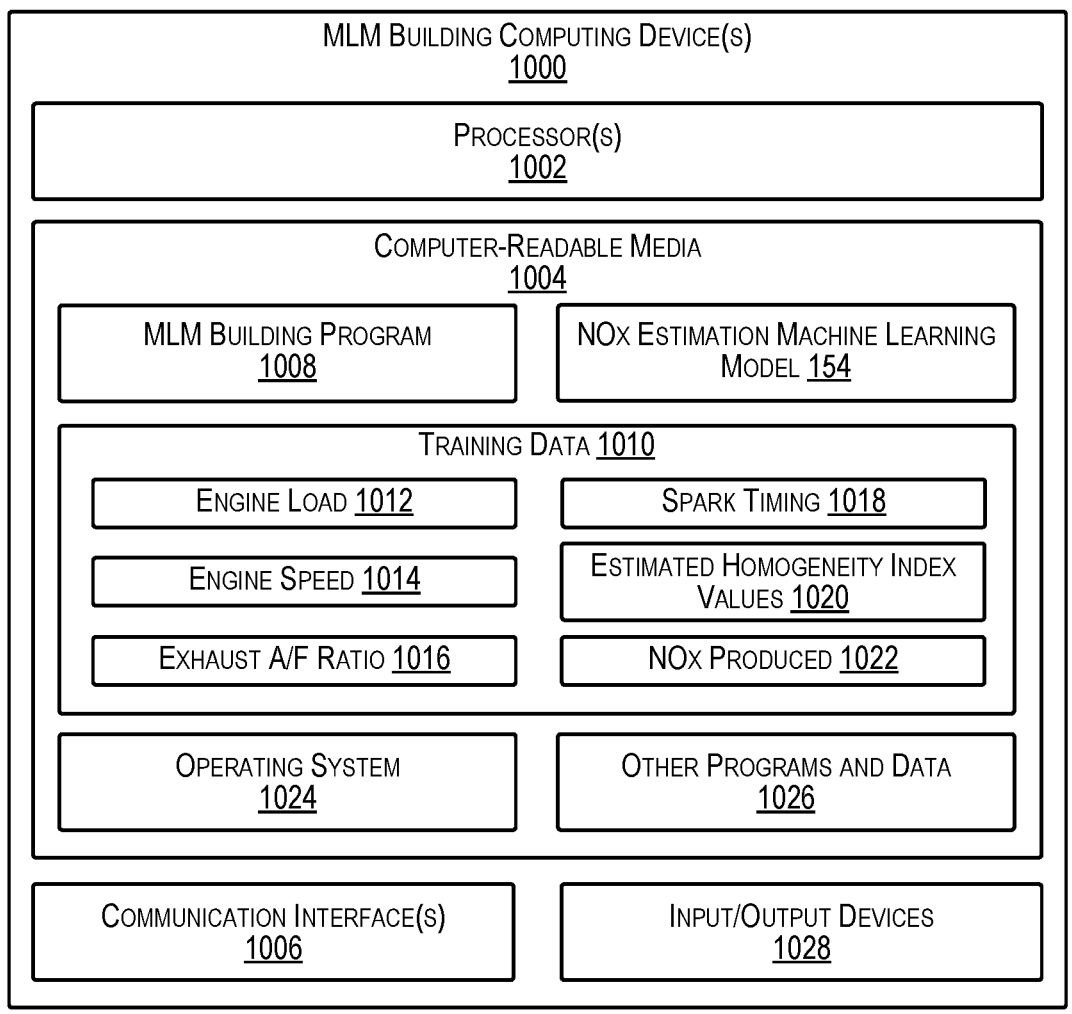
FIG. 10 illustrates one or more machine learning model building computing devices according to some implementations.

FIG. 10 illustrates select components of one or more machine learning model (MLM) building computing device(s) 1000 that may be used to implement some functionality of the MLM building services described herein. MLM building computing device(s) 1000 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used. In some cases, the MLM building computing device(s) 1000 may be the same computing device(s) as the simulation computing device(s) 800 and/or the data structure building computing device(s) 900 described above, while in other cases, the MLM building computing device(s) 1000 may be partially or entirely separate from the simulation computing devices 800 and/or the data structure building computing device(s) 900.

Further, while the figures illustrate the functional components and data of the MLM building computing device(s) 1000 as being present in a single location, these components and data may alternatively be distributed across different computing devices and different locations in any manner Consequently, the functions may be implemented by one or more computing devices, with the various functionality described above distributed in various ways across the different computing devices. Multiple MLM building computing device(s) 1000 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each MLM building computing device(s) 1000 may include one or more processors 1002, one or more computer-readable media 1004, and one or more communication interfaces 1006. Each processor 1002 may include or may similar to any of the processors 802 discussed above with respect to FIG. 8. The computer-readable media 1004 may include or may similar to any of the computer-readable media 1004 discussed above with respect to FIG. 8. The communication interfaces 1006 may include or may similar to any of the communication interfaces 806 discussed above with respect to FIG. 8.

The computer-readable media 1004 may be used to store any number of functional components that are executable by the processors 1002. In many implementations, these functional components comprise instructions or programs that are executable by the processors 1002 and that, when executed, specifically configure the one or more processors 1002 to perform the actions attributed above to the MLM building computing device(s) 1000. Functional components stored in the computer-readable media 1004 may include a MLM building program 1008. For example, the MLM building program 1008 may receive training data 1010 from a data storage included in the computer-readable media 1004, and may use the training data to train the NOx Estimation Machine Learning Model 154. As an example, the training data 1010 may include engine load values 1012, engine speed values 1014, exhaust air/fuel ratio values 1016, spark timing values 1018, estimated homogeneity index values 1020 for corresponding to various NOx produced values 1022. For example, at least some of the training data 1010 may be determined empirically. Additional functional components stored in the computer-readable media 1004 may include an operating system 1024 for controlling and managing various functions of the MLM building computing device(s) 1000.

The MLM building computing device(s) 1000 may also include or maintain other functional components and data not specifically shown in FIG. 10, such as other programs and data 1026, which may include programs, drivers, etc., and the data used or generated by the functional components. Further, the MLM building computing device(s) 1000 may include many other logical, programmatic, and physical components, of which those described above are merely examples that are related to the discussion herein.

The MLM building computing device(s) 1000 may further be equipped with various input/output (I/O) devices 1028. Such I/O devices 1028 may include or may similar to any of the I/O devices 832 discussed above with respect to FIG. 8.

The example processes described herein are only examples of processes provided for discussion purposes. Numerous other variations will be apparent to those of skill in the art in light of the disclosure herein. Further, while the disclosure herein sets forth several examples of suitable systems, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as programs stored on computer-readable media, and executed by the processor(s) herein. Generally, programs include routines, modules, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these programs and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
an engine including a piston mounted for reciprocating within a cylinder including a combustion chamber, the combustion chamber including an intake valve associated with an intake passage, an exhaust valve associated with an exhaust passage for receiving an exhaust gas from the combustion chamber, and a fuel injector positioned to inject fuel into air received into the combustion chamber through the intake passage for combustion in the combustion chamber;
one or more sensors for sensing one or more parameters of the engine;
one or more processors in communication with the one or more sensors;
one or more computer-readable media storing instructions which, when executed by the one or more processors, program the one or more processors to perform operations comprising:
receiving sensor data from the one or more sensors;
based on the sensor data, accessing a data structure for determining a homogeneity index indicative of a homogeneity of an air-fuel mixture within the combustion chamber at least during a transient engine operating condition, the data structure including one or more homogeneity index distributions having been determined in advance using a computer simulation of the engine;
determining an estimated amount of NOx in the exhaust gas due at least to the transient engine operating condition based at least on inputting the homogeneity index into a machine learning model trained to output an indication of the estimated amount of NOx in the exhaust gas based at least on the homogeneity index; and
controlling an engine component based at least partially on the estimated amount of NOx in the exhaust gas.

2. The system as recited in claim 1, wherein:
the sensor data includes at least one of: an indicated in-cylinder pressure, an indicated intake pressure, an indicated exhaust pressure, an indicated valve timing, an indicated fuel injection timing, or an indicated fuel injection quantity; and
the homogeneity index is determined by accessing the data structure based at least partially on the at least one of the indicated in-cylinder pressure, the indicated intake pressure, the indicated exhaust pressure, the indicated valve timing, the indicated fuel injection timing, or the indicated fuel injection quantity.

3. The system as recited in claim 1, further comprising an NOx control device in communication with the exhaust passage, wherein following combustion, exhaust gas is expelled through the exhaust passage to the NOx control device, the operations further comprising:
comparing a total estimated amount of NOx since a last regeneration event for the NOx control device with a regeneration threshold for total NOx; and
based on the total estimated amount of NOx exceeding the regeneration threshold, controlling the engine component by sending the instruction to perform regeneration of the NOx control device.

4. The system as recited in claim 3, wherein the trained machine learning model is an artificial neural network trained for the engine and the NOx control device using an external computing device.

5. The system as recited in claim 3, wherein:
the NOx control device is a lean NOx trap; and
the regeneration includes operating the engine fora specified period of time with a rich air-fuel ratio.

6. The system as recited in claim 3, wherein:
the NOx control device is a selective catalytic reduction device; and
the regeneration includes exposing the NOx control device to at least one of: urea, anhydrous ammonia, or aqueous ammonia.

7. The system as recited in claim 1, wherein the fuel injector is positioned to one of:
inject fuel directly into the combustion chamber; or
inject fuel into the intake passage.

8. A method comprising:
receiving, by one or more processors, sensor data from one or more sensors indicating one or more engine parameters of an engine including a combustion chamber;
based on the sensor data, accessing a data structure for determining a homogeneity index indicative of a homogeneity of an air-fuel mixture within the combustion chamber at least during a transient engine operating condition, the data structure including one or more homogeneity index distributions having been determined in advance using a computer simulation of the ermine;
determining an estimated amount of NOx in an exhaust gas exiting the combustion chamber due at least to the transient engine operating condition based at least on inputting the homogeneity index into a machine learning model trained to output an indication of the estimated amount of NOx in the exhaust gas based at least on the homogeneity index; and
based at least in part on the estimated amount of NOx, sending an instruction to control an engine component.

9. The method as recited in claim 8, wherein the sensor data includes at least one of: an indicated in-cylinder pressure, an indicated intake pressure, an indicated exhaust pressure, an indicated valve timing, an indicated fuel injection timing, or an indicated fuel injection quantity,
the method further comprising:
generating the data structure having one or more homogeneity index distributions determined in advance using a computer simulation of the engine, and
wherein the determining the homogeneity index includes accessing the data structure based at least partially on the at least one of: the indicated in-cylinder pressure, the indicated intake pressure, the indicated exhaust pressure, the indicated valve timing, the indicated fuel injection timing, or the indicated fuel injection quantity.

10. The method as recited in claim 8, wherein the engine includes an NOx control device in communication with an exhaust passage from the combustion chamber, wherein following combustion, exhaust gas is expelled through the exhaust passage to the NOx control device, the method further comprising:
comparing a total estimated amount of NOx since a last regeneration event for the NOx control device with a regeneration threshold for total NOx; and
based on the total estimated amount of NOx exceeding the regeneration threshold, controlling the engine component by sending the instruction to perform regeneration of the NOx control device.

11. The method as recited in claim 10, wherein the trained machine learning model is an artificial neural network trained for the engine and the NOx control device using an external computing device.

12. The method as recited in claim 10, wherein the NOx control device is a lean NOx trap, and sending the instruction to control the engine component comprises sending one or more control signals to operate the engine fora specified period of time with a rich air-fuel ratio for regenerating the lean NOx trap.

13. The method as recited in claim 10, wherein the NOx control device is a selective catalytic reduction device, and sending the instruction to control the engine component comprises sending one or more control signals for regenerating the selective catalytic reduction device by causing the selective catalytic reduction device to be exposed to at least one of: urea, anhydrous ammonia, or aqueous ammonia.

14. The method as recited in claim 8, wherein the engine includes a fuel injector positioned to one of:
inject fuel directly into the combustion chamber; or
inject fuel into an intake passage.

15. A system comprising:
an engine including a combustion chamber and one or more sensors;
one or more processors in communication with the one or more sensors; and
one or more computer-readable media storing instructions which, when executed by the one or more processors, program the one or more processors to perform operations comprising:
receiving sensor data from the one or more sensors indicating one or more engine parameters of the engine;
based on the sensor data, accessing a data structure for determining a homogeneity index for an air-fuel mixture within the combustion chamber at least during a transient engine operating condition, the data structure including one or more homogeneity index distributions having been determined in advance using a computer simulation of the engine;
determining an estimated amount of NOx in an exhaust gas exiting the combustion chamber due at least to the transient engine operating condition based at least on inputting the homogeneity index into a machine learning model trained to output an indication of the estimated amount of NOx in the exhaust gas based at least on the homogeneity index; and
based at least in part on the estimated amount of NOx, sending an instruction to control an engine component.

16. The system as recited in claim 15, wherein the sensor data includes at least one of: an indicated in-cylinder pressure, an indicated intake pressure, an indicated exhaust pressure, an indicated valve timing, an indicated fuel injection timing, or an indicated fuel injection quantity,
the operations further comprising:
generating the data structure having one or more homogeneity index distributions determined in advance using a computer simulation of the engine; and
wherein the determining the homogeneity index includes accessing the data structure based at least partially on the at least one of: the indicated in-cylinder pressure, the indicated intake pressure, the indicated exhaust pressure, the indicated valve timing, the indicated fuel injection timing, or the indicated fuel injection quantity.

17. The system as recited in claim 15, further comprising an NOx control device positioned to receive the exhaust gas exiting the combustion chamber, the operations further comprising:
comparing a total estimated amount of NOx since a last regeneration event for the NOx control device with a regeneration threshold for total NOx; and
based on the total estimated amount of NOx exceeding the regeneration threshold, controlling the engine component by sending the instruction to perform regeneration of the NOx control device.

18. The system as recited in claim 17, wherein the trained machine learning model is an artificial neural network trained for the engine and the NOx control device using an external computing device.

19. The system as recited in claim 17, wherein the NOx control device is a lean NOx trap, and sending the instruction to control the engine component comprises sending one or more control signals to operate the engine fora specified period of time with a rich air-fuel ratio for regenerating the lean NOx trap.

20. The system as recited in claim 17, wherein the NOx control device is a selective catalytic reduction device, and sending the instruction to control the engine component comprises sending one or more control signals for regenerating the selective catalytic reduction device by causing the selective catalytic reduction device to be exposed to at least one of: urea, anhydrous ammonia, or aqueous ammonia.

* * * * *